United States Patent
Marpinard

(10) Patent No.: US 8,613,408 B2
(45) Date of Patent: Dec. 24, 2013

(54) AIRCRAFT WITH A REINFORCED FLOOR STRUCTURE

(75) Inventor: Michel Marpinard, Espanes (FR)

(73) Assignee: Airbus Operations, Toulouse (FR)

( * ) Notice: Subject to any disclaimer, the term of this patent is extended or adjusted under 35 U.S.C. 154(b) by 422 days.

(21) Appl. No.: 12/705,167

(22) Filed: Feb. 12, 2010

(65) Prior Publication Data

US 2010/0213315 A1 Aug. 26, 2010

(30) Foreign Application Priority Data

Feb. 24, 2009 (FR) ...................................... 09 51164

(51) Int. Cl.
*B64C 1/18* (2006.01)
*B64C 1/22* (2006.01)
(52) U.S. Cl.
USPC .......................................... 244/131; 244/119
(58) Field of Classification Search
USPC ............... 244/118.1, 117 R, 118.2, 119, 120, 244/129.1, 131
See application file for complete search history.

(56) References Cited

U.S. PATENT DOCUMENTS

| | | | | |
|---|---|---|---|---|
| 2,618,448 | A * | 11/1952 | Robert | 244/123.7 |
| 5,086,996 | A * | 2/1992 | Roeder et al. | 244/119 |
| 7,546,979 | B1 * | 6/2009 | Estell et al. | 244/123.1 |
| 8,066,221 | B2 * | 11/2011 | Rouyre | 244/119 |
| 2009/0283637 | A1 * | 11/2009 | Nolla | 244/119 |
| 2009/0294587 | A1 * | 12/2009 | Ricaud et al. | 244/119 |
| 2010/0140403 | A1 * | 6/2010 | Barre et al. | 244/119 |

FOREIGN PATENT DOCUMENTS

| | | |
|---|---|---|
| EP | 0 408 432 A1 | 1/1991 |
| FR | 2 689 851 | 10/1993 |
| WO | WO 2007122096 A1 * | 11/2007 |

OTHER PUBLICATIONS

French Search Report issued in French Patent Application No. 0951164, on Oct. 21, 2009, with trans.

* cited by examiner

*Primary Examiner* — Timothy D Collins
*Assistant Examiner* — Brian M O'Hara
(74) *Attorney, Agent, or Firm* — Oliff & Berridge, PLC

(57) ABSTRACT

The aircraft includes:
- a floor;
- a top panel of a central wing box;
- at least two rails and at least two beams, the rails and the beams extending between the floor and the panel; and
- at least one reinforcement suitable, independently of the rails, for taking up a force acting at the level of the floor and for transmitting said force to the beams and/or to the top panel.

9 Claims, 3 Drawing Sheets

AIRCRAFT WITH A REINFORCED FLOOR STRUCTURE

FIELD OF THE INVENTION

The invention relates to aircraft, in particular those in which the structure is designed for cargo type utilization.

BACKGROUND OF THE INVENTION

It is known to reinforce the structure of an airplane to enable it to receive on its floor, not passengers, but rather loads such as pallets. The structure then needs to support the inertial forces that are generated by the pallets when they are subjected to the accelerations of the airplane and that are transmitted to the structure of the airplane.

This problem affects the central wing box most particularly. The wing box is already strongly stressed by forces coming from the wings. Thus, accompanying FIGS. 1 and 2 show a box section in a vertical plane perpendicular to the longitudinal direction of the fuselage. The box 2 has a bottom panel 4 and a top panel 6 extending above the bottom panel. These two panels are generally plane and horizontal, being spaced apart from each other. They are connected to each other by frames 8 having the wings 10 of the airplane attached thereto. The remainder of the fuselage 12 extends above the box 2. The wings subject the top panel 6 to compression forces $F_E$ and the bottom panel 4 to traction forces $F_1$. A shear force T appears at the junction between the wings and the frames, which force is balanced by the frames. Each of the wings also generates a bending moment $M_f$ on the box.

Accompanying FIG. 3 shows the top panel 6 in greater detail in a similar view. The atmospheric pressure P inside the cabin of the airplane also acts on the top panel. Thus, this panel is subjected simultaneously to compression forces F and to pressure forces P that are uniformly distributed. This set of stresses applied to the panel and its stiffeners makes the panel particularly sensitive to instability. Under such conditions, it is desirable not to add any shear force (a force acting along the vertical axis of the airplane) and not to add any bending moment between the two bearing points at the ends of the panel.

Finally, the relative deformation of the central wing box can be considerable. Thus, accompanying FIG. 4, once more in vertical section, shows one lateral half of the box 2, with continuous lines showing its shape when it is not subjected to stresses, and with chain-dotted lines showing its shape when it is deformed under the effect of said stresses. The top panel 6 tends to sag downwards, as does the bottom panel 4. Nevertheless, the top panel has its ends moved towards each other while the bottom panel has its ends pulled apart from each other. The frames are subjected to turning through an angle □ about an axis parallel to the longitudinal direction of the fuselage.

Consequently, any structural reinforcements that might be made must not add excessively to the stiffness of the box so as to allow it to deform in this way, since otherwise the movements imposed on the box would load the new structural elements and their environment excessively.

Consideration may also be given to the positions of pallets and their anchor points. Accompanying FIG. 5 is a section view in a vertical plane perpendicular to the longitudinal direction of the airplane and showing the central wing box together with two loaded pallets 16 received on the floor 14 above the box. In general, the anchor points for the pallets are situated at their lateral sides, at left, central, and right anchor points 18, 20, and 22. At each of these anchor points, forces in the vertical and lateral directions are introduced into the floor. The forces introduced via the lateral points 18 and 22 can be balanced without difficulty. In contrast, it is difficult to balance the forces introduced via the central point 20, while still complying with the constraints associated with the environment of the central wing box.

OBJECT AND SUMMARY OF THE INVENTION

An object of the invention is to improve the capacity of the structure of the airplane to accommodate forces, in particular via the central wing box, and for example via the central points, e.g. in the context of cargo type use.

To this end, the invention provides an aircraft that includes:
a floor;
a top panel of a central wing box;
at least two rails and at least two beams, the rails and the beams extending between the floor and the panel; and
at least one reinforcement suitable, independently of the rails, for taking up a force acting at the level of the floor and for transmitting said force to the beams and/or to the top panel.

Preferably, the reinforcement is suitable, independently of the panel, for taking up a vertical force acting at the floor and for transmitting said force to the beams without transmitting it to the panel.

Thus, the force is transmitted to the beams, which are parts capable of accommodating it. Transmission takes place without stressing the panel, where the panel would be particularly unstable if it were to be subjected to this type of force. The vertical forces on the floor are thus taken up without risk for the stability of the panel.

Preferably, the reinforcement is suitable, independently of the beams, for taking up a lateral force acting at the floor and for transmitting said force to the panel without transmitting it to the beams.

Thus, the lateral forces are transmitted without the beams or the rails being stressed thereby, given that they are poorly suited to accommodating forces of this type.

Advantageously, the reinforcement is secured to the beams in the vertical direction.

Thus, the reinforcement transmits the vertical forces to the beams, which are capable of supporting them.

Advantageously, the reinforcement presents lateral clearance relative to the beams.

This avoids transmitting any lateral force to the beams since, in general, they are not suitable for accommodating such forces.

Preferably, the reinforcement is connected to the panel by two links that are inclined in mutually opposite directions, preferably converging towards the panel.

Thus, the lateral forces are resolved along the two links. The vertical components that result from this resolution cancel each other. As for the horizontal components, arrangements are made for them to be taken up by the panel, independently of the beams which are not suited to accommodating such forces.

Preferably, the panel is stiffened by at least one stiffener and the links define straight lines presenting a point of intersection situated level with a neutral axis of the assembly formed by the panel and its stiffener.

Thus, force transmission is optimized while reducing to a minimum any risks of panel instability.

Advantageously, for each reinforcement, the aircraft includes a single fork connecting the links to the panel.

Preferably, the aircraft presents a ball joint at at least one end of each link. Thus, the freedom of the rails to move in the longitudinal direction of the fuselage relative to the central wing box remains unimpeded.

Advantageously, the reinforcement, or at least one of the reinforcements, intersects a vertical longitudinal midplane of the aircraft.

BRIEF DESCRIPTION OF THE DRAWINGS

Other characteristics and advantages of the invention appear further from the following description of an airplane constituting a preferred embodiment of the invention and described with reference to the accompanying drawings, in which.

MORE DETAILED DESCRIPTION

Figure 6:
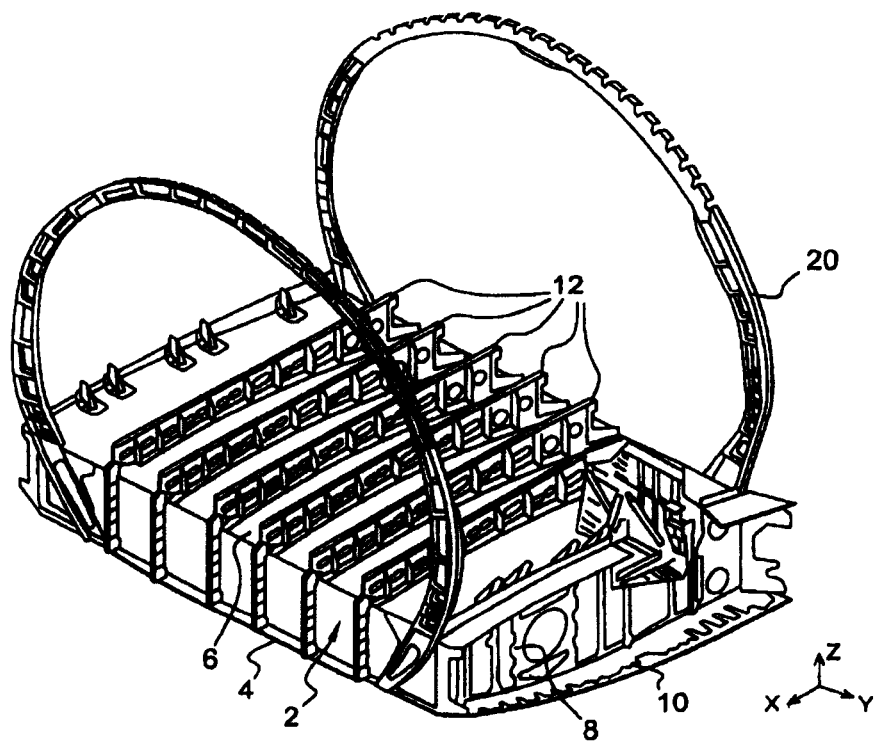
FIG. 6 is a cutaway fragmentary perspective view of the structure of an airplane of the invention through the central wing box.

An airplane constituting an embodiment of the aircraft of the invention is described below with reference to FIGS. 6 to 8. Nevertheless, the invention is not limited to airplanes.

The airplane comprises a fuselage, two wings, engines, and landing gear (not shown). With reference to FIG. 6, the fuselage includes a central wing box 2 through which the two wings are connected together.

Below, use is made of the X, Y, and Z frame of reference in which the directions X and Y are the horizontal directions respectively parallel and perpendicular to the longitudinal direction of the fuselage, and the direction Z is the vertical direction.

The box 2 comprises a bottom panel 4 and a top panel 6 that are horizontal, and parallel to each other, and that are spaced apart facing each other. Each of them is stiffened by one or more stiffeners. The airplane has vertical frames 8 parallel to the direction X, interconnecting the side extremities of the bottom and top panels. The airplane also has plane circular part-rings 20 on a common axis, each occupying a plane perpendicular to the direction X and each connected at its base to the central wing box.

The box has longitudinal beams 12 parallel to the direction X. The beams extend parallel to one another, spaced apart, and facing one another. They are generally disposed in a common horizontal plane and all of them bear via their bottom flanges 14 on the top face of the top panel 6.

The airplane has longitudinal rails 16, one for each beam. The rails present the same disposition as the beams, however they are located above them, coinciding with respective ones of the beams. Each rail is attached to the corresponding beam by means of shackles that ensure they are mutually positioned in the lateral and vertical directions Y and Z, while nevertheless leaving them with relative freedom to move in the direction X. This connection between the rails and the beams serves to avoid transmitting movements between them in the longitudinal direction X. The shackles are not shown, except for the special shackles that are described below. By way of example, each shackle is connected to the rail by means of a pin (not shown) parallel to the lateral direction Y. This pin secures the shackle to the rail in the vertical direction Z that leaves the shackle free to pivot relative to the rail about said pin. The shackle is connected to the beam by means of another pin analogous to the first.

The airplane has a horizontal floor 14 parallel to the panel 6. The floor rests on the top faces 21 of the rails 16. Seats may be fastened to the rails through the floor. For this purpose, the seats are engaged in slideways 23 of the rails that pass through the floor.

Figure 1:
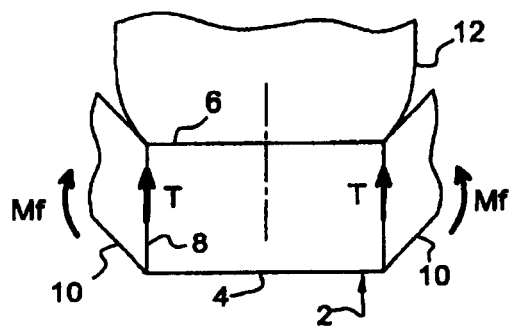
FIGS. 1 to 5 are section views on a vertical plane perpendicular to the longitudinal direction of the fuselage through a central wing box of an airplane of the prior art.
Figure 2:
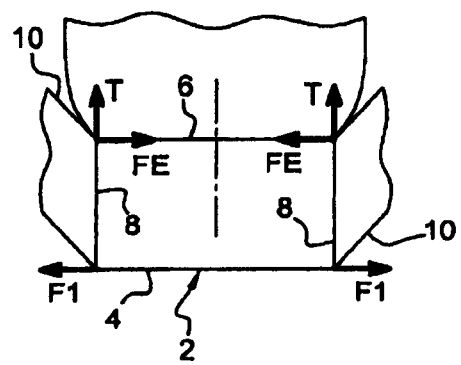
Figure 3:
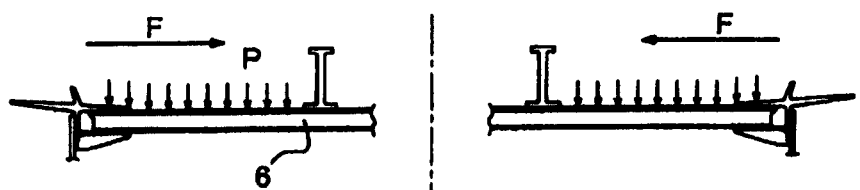
Figure 4:
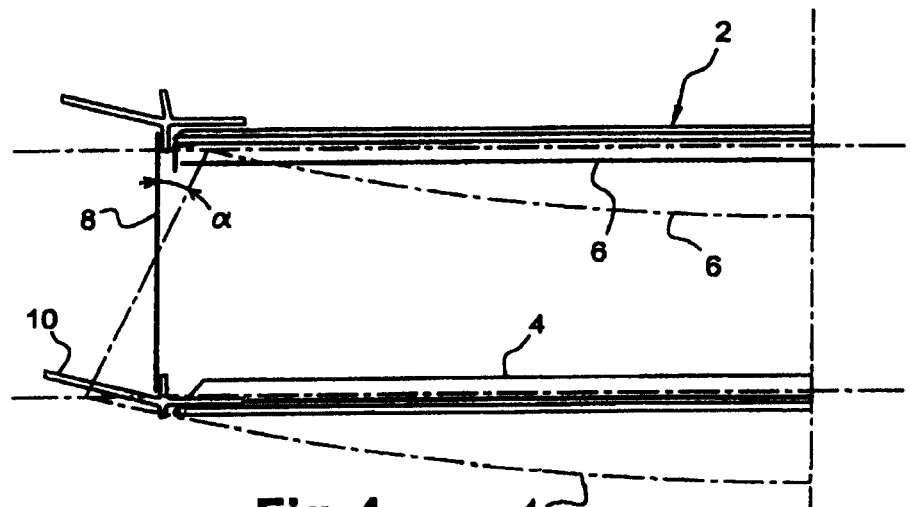
Figure 5:
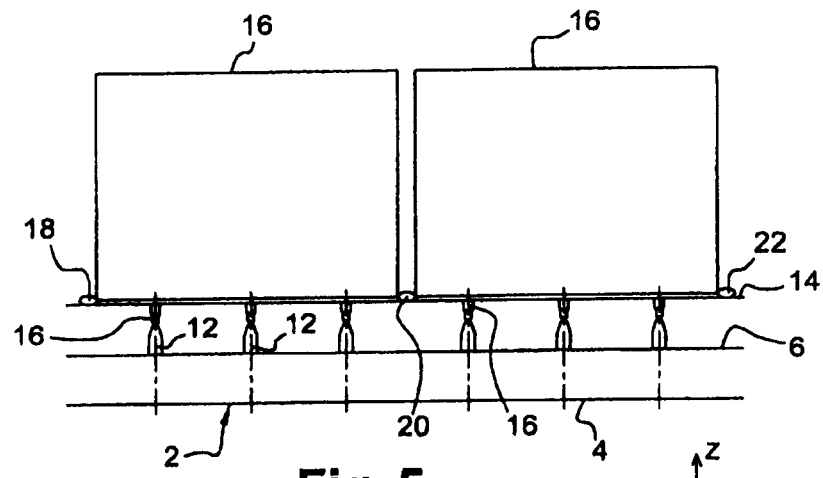

It is assumed that the airplane of the invention is designed to carry loads such as loaded pallets 16, as described above with reference to FIG. 5. For this purpose, it is desired for the forces that may be introduced at the central point 20 of FIG. 5 in the plane of the figure, to be resolved firstly into components that are oriented in the vertical direction Z, and secondly into components that are oriented in the lateral direction Y. At this central point, forces oriented in at least one or the other of those two directions can be introduced into the floor. It is desired to introduce the vertical forces into the beams 12 since they are structural elements capable of accommodating forces of this type even though they do not present substantial stiffness in the lateral direction Y. Similarly, it is desired to introduce the lateral forces into the stiffened top panel 6 via the neutral axis of the assembly constituted by the panel and its stiffener (or its stiffeners), which neutral axis is situated at the center of gravity of the total section constituted by the panel and the associated stiffener. This minimizes the impact of such extra loading on the panel. The stiffened panel 6 is very sensitive to instability. Thus, introducing vertical forces to the panel amounts to applying a shear force to the stiffened panel. Similarly, a force in the lateral direction Y, if introduced at a distance from the neutral axis, would generate a bending moment capable of having harmful consequences on the stability of the stiffened panel.

Figure 7:
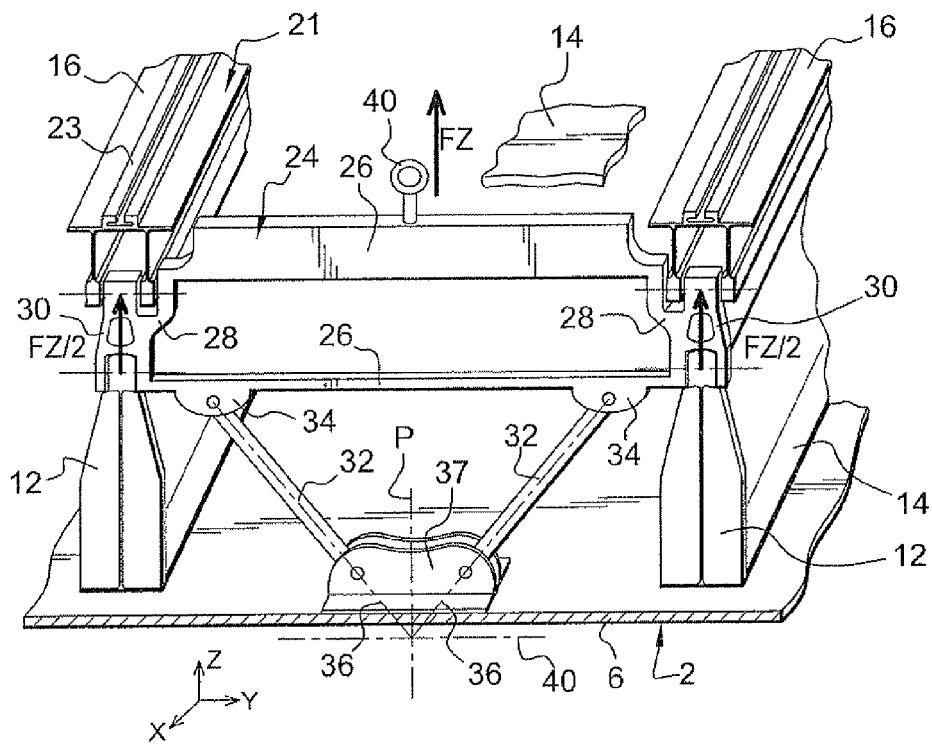
FIGS. 7 and 8 are fragmentary perspective views of the central portion of the FIG. 6 structure.
Figure 8:
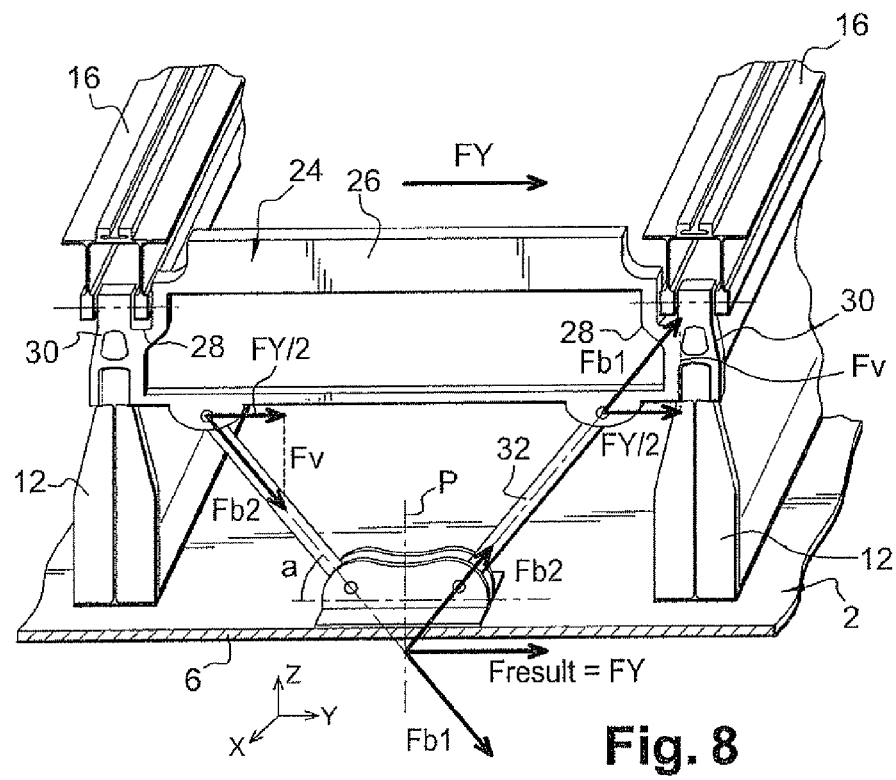

FIGS. 7 and 8 show the specific arrangement provided between the two beams 12 that are situated on either side of the vertical longitudinal midplane of the airplane, given reference P. It is in this plane that the central point 20 is situated.

A reinforcement 24 or an adapter is provided that specifically comprises a rigid frame. The frame has two horizontal cross-members 26 extending in the lateral direction Y and two uprights 28 interconnecting the ends of the cross-members and generally extending in the vertical direction. The center of the frame is hollow so that the two cross-members 26 lie at a distance from each other, as do the two uprights 28. Two shackles 30 are rigidly fastened to the respective uprights 28. Each shackle connects the rail 16 to the corresponding beam 12 as described above. Thus, by means of the shackles, the adapter 24 rests on the beams 12. Clearance is provided in the direction Y in the connections between the adapter 24 and the rails 20, and also in the connections between the adapter 24 and the beams 12.

Two straight links 32 are also provided connecting the adapter 24 to the top panel 6. For this purpose, the bottom cross-member of the adapter presents two lobes 34 for receiving the respective top ends of the links. In the present example, the bottom ends of the links are fastened to the panel 6 by means of a single pair of forks 37 receiving the ends. Specifically, each link is connected to the adapter 24 and to the panel 6 by means of ball joints so as to avoid hindering the freedom of the rails 16 to move in the longitudinal direction X relative to the beams and to the central wing box.

The links 32 lie in the same general plane as the adapter 24, which plane is parallel to the directions Y and Z. The links are rectilinear, and inclined in opposite directions, here converging towards the panel. The longitudinal direction of each link defines a straight line 36. The two straight lines present a point of intersection 38 that lies on the neutral axis 40 of the stiffened panel. (To avoid spoiling the clarity of the figures, the stiffener is not shown in FIGS. 7 and 8.) The neutral axis thus lies outside the panel itself. The arrangement as a whole formed by the adapter 34, the links 32, and the pair of forks 37 presents a plane of symmetry constituted by the plane P.

At least one support 40 is provided on the reinforcement 24 which support 40 passes through the floor 14 so that the pallet 16 can be fastened directly to the reinforcement 24 through the floor.

A plurality of arrangements of this type are preferably provided, having respective reinforcements 24 located along the direction X and spaced apart from one another.

By means of this arrangement, forces are transmitted as follows.

Consideration is given initially to a vertical force FZ shown in FIG. 7, introduced to the support 40 by at least one of the pallets 16, with this force being taken up by the adapter 24 and transmitted to the beams 12 and to the beams only. This force is transmitted at the beams in the form of two vertical forces FZ/2 that are balanced by the beams. Since the beams 12 present a high level of stiffness in the vertical direction, they are well able to accommodate these forces. The force is therefore transmitted neither to the rails 16, nor to the links 32, nor to the panel 6. The transmission of force to the beams 12 takes place independently of the rails, the links, and the panel. The figure shows a force FZ that is oriented upwards, but the same applies for a force that is oriented downwards.

Consideration is now given to a force FY acting in the lateral direction Y (to the right in this example, but equally well to the left), the force acting via the support 40. This force is balanced solely by the links 32. Because of the clearance in the direction Y in the connections between the adapter 24 and the rails 20, and also in the connections between the adapter 24 and the beams, no force in the lateral direction Y is introduced into these elements via the connections. (It being understood that neither the beams 12 nor the rails have much lateral stiffness, so they should not be loaded in this direction.) Consequently, the force FY is transmitted by the adapter 24 solely to the two links 32 in the form of a lateral force FY/2.

For each link, this force FY/2 is resolved into a vertical component Fv and a component Fb1 or Fb2 that is parallel to the link. The two vertical components Fv are oriented in mutually opposite directions so they cancel. The two components Fb1 and Fb2 add, and after being transmitted via the forks, they produce a resultant force Fresult in the neutral axis of the stiffened panel 6, where the force Fresult is identical to the force Fy. Thus, the two links are loaded, one in compression and the other in fraction, with the forces Fb1 and Fb2. These forces are introduced into the top panel via the pair of forks. Because of the arrangement and the orientation of the links, the resultant of these forces is applied at the level of the neutral axis of the stiffened panel 6. This panel together with its stiffener thus receives only a force equal to FY that is oriented solely along the lateral direction Y. The impact of this transmission on the panel 6 is moderate since the only additional force acts along the lateral direction. There is no shear force nor any bending moment that might threaten the stability of the panel.

It can thus be seen that the reinforcement 24 is suitable, independently of the rails 16 and of the panel 6, for taking up a vertical force acting on the floor 14 and for transmitting this force to the beams 12 without transmitting it to the panel. The reinforcement is also suitable, independently of the rails and the beams, for taking up a lateral force acting on the floor and for transmitting this lateral force to the top panel without transmitting it to the beams.

Given that any stress in a plane parallel to the directions Y and Z can be resolved into a vertical component FZ and a lateral component FY, it can be seen that any vertical component is transmitted to the beams and to the beams alone, while any lateral component is transmitted to the stiffened panel, and to it alone. Thus, the forces resulting from the pallets are introduced into those two elements that present the best capacity for withstanding them and accommodating them.

It can thus be seen that only the forces derived from the connections of the pallets are introduced by the reinforcement into the central wing box. The orientation of the links does not lead to any additional force being introduced. This avoids introducing stiffnesses opposing the potential deformation of the box. Under such conditions, the structure added relative to the base structure does not itself become loaded as a result of the box deforming because of forces coming from the wings. The lobes 34 are preferably lowered as much as possible so that the hinge points between the links and the frame are as low as possible, thereby bringing the links as close as possible to the horizontal direction and reducing the angle a they make relative to said direction. As a result, the vertical stiffness of the link system is reduced, possibly sufficiently to make it negligible.

Such an arrangement is particularly suitable for transporting freight or loads such as pallets by airplane, i.e. when the floor does not receive passenger seats but is used in cargo mode. This arrangement may also be used more generally when it is necessary to have an additional force take-up point that was not provided on initial design of the airplane. This applies for example when the commercial arrangement of an airplane is subjected to alterations, e.g. for VIP (very important person) type uses with special furniture to be installed.

Naturally, numerous modifications may be applied to the invention without going beyond the ambit thereof.

Although the reinforcements 24 are particularly useful in the midplane P of the airplane for taking up forces at the central point 20, it is entirely possible for them to be provided at a distance from said plane, between pairs of beams other than those shown in FIG. 7, depending on whether it is desired to take up forces that appear between those beams.

Although the arrangement shown in FIGS. 7 and 8 provides very good force transmission, provision could be made to omit the links 32 so that the reinforcement 24 serves only to transmit vertical forces to the beams 12, without taking up lateral forces independently thereof. Alternatively, the connection between the reinforcement and the shackles 30 could be omitted, such that the reinforcement serves only to transmit lateral forces to the panel without serving to take up vertical forces independently of the panel.

Provision could be made for the links to diverge towards the panel.

The invention claimed is:
1. An aircraft, including:
a fuselage floor;
a top panel of a central wing box;
at least two rails and at least two beam, the rails and the beams extending in a fuselage of the aircraft between the floor and the panel, below the floor and above the panel; and
at least one reinforcement suitable, independently of the rails for taking up a force acting at the level of the floor and for transmitting said force to at least one of the beams and the top panel,
and wherein:
the beams are horizontal, the rails and the beams are parallel to each other and additionally are parallel to a longitudinal direction of the fuselage, the rails are located above the beams and in coincidence with respective ones of the beams, the at least one reinforcement is connected to the panel by two links that are coplanar with a plane perpendicular to the rails and that are inclined in mutually opposite directions, and the at least one reinforcement extends into the fuselage and along a horizontal direction perpendicular to a longitudinal direction of the fuselage.

2. An aircraft according to claim 1, wherein the at least one reinforcement is suitable, independently of the panel, for taking up a vertical force acting at the floor and for transmitting said force to the beams without transmitting it to the panel.

3. An aircraft according to claim 1, wherein the at least one reinforcement is suitable, independently of the beams, for taking up a lateral force acting at the floor and for transmitting said force to the panel without transmitting it to the beams.

4. An aircraft according to claim 1, wherein the at least one reinforcement is secured to the beams in the vertical direction.

5. An aircraft according to claim 1, wherein the at least one reinforcement presents lateral clearance relative to the beams.

6. An aircraft according to claim 1, wherein the panel is stiffened by at least one stiffener and the links define straight lines presenting a point of intersection situated level with a neutral axis of the assembly formed by the panel and its stiffener.

7. An aircraft according to claim 1, that includes, for each reinforcement, a single fork connecting the links to the panel.

8. An aircraft according to claim 1, including a ball joint on at least one end of each link.

9. An aircraft according to claim 1, wherein at least one of the at least one reinforcement intersects a vertical longitudinal midplane of the aircraft.

* * * * *